United States Patent [19]
Hendrick

[11] 3,815,873
[45] June 11, 1974

[54] VALVE ASSEMBLY
[75] Inventor: Fred W. Hendrick, Long Beach, Calif.
[73] Assignee: Robertshaw Controls Company, Richmond, Va.
[22] Filed: June 7, 1973
[21] Appl. No.: 367,910

[52] U.S. Cl.................. 251/337, 251/357, 251/85
[51] Int. Cl............................................. F16k 25/00
[58] Field of Search .......... 251/356, 357, 358, 337, 251/360, 84, 85, 88; 137/540, 542

[56] References Cited
UNITED STATES PATENTS

| | | | |
|---|---|---|---|
| 2,142,224 | 1/1939 | Turlay | 251/337 X |
| 2,667,892 | 2/1954 | Gentzel | 251/360 X |
| 2,902,249 | 9/1959 | Meusy | 251/358 X |
| 3,204,655 | 9/1965 | Brebtschneider | 251/88 X |
| 3,276,741 | 10/1966 | Nielsen et al. | 251/357 X |
| 3,310,277 | 3/1967 | Nielsen et al. | 251/358 X |
| 3,625,481 | 12/1971 | Rattan | 251/356 |
| 3,700,206 | 10/1972 | Jones | 251/84 |
| 3,716,215 | 2/1973 | Washbourn et al. | 251/358 |

Primary Examiner—William R. Cline
Assistant Examiner—Ira S. Lazarus
Attorney, Agent, or Firm—Anthony A. O'Brien

[57] ABSTRACT

A valve assembly including a split retaining ring captured in a recess between a retainer and a backup plate, and a valve stem having a tapered end received in a cavity in the retainer and a circumferential groove receiving the split retaining ring to lock the valve assembly together, the split retaining ring being expandable to ride over the surface of the valve stem from the tapered end to the groove to facilitate assembly.

10 Claims, 3 Drawing Figures

PATENTED JUN 11 1974 3,815,873

VALVE ASSEMBLY

BACKGROUND OF THE INVENTION

1. Field of the Invention

The present invention pertains to valve assemblies and, more particularly, to easily assembled locking valve assemblies.

2. Description of the Prior Art

Valve assemblies having a valve stem and a backup plate carrying a resilient valve face have been difficult and expensive to assemble in the past due to the use of spring clips or cross pins extending through holes drilled in the valve stem and backup plate to secure the assembly. The labor cost involved in assembling such valve assemblies is high due to the precision required in drilling the valve stem and the backup plate and in inserting the spring clip or cross pin in the drilled holes which, of course, requires alignment of the holes in the valve stem and the backup plate prior to insertion of the spring clip or cross pin. Furthermore, such prior art valve assemblies cannot be conveniently disassembled for reworking or servicing. For valve assemblies such as pilot valves, attempts to simplify assembly have been hampered by the high degree of free valve alignment required; and, additionally, the possibility of accidental or inadvertent diassembly cannot be compromised in order to simplify assembly.

The prior art, as exemplified by U.S. Pat. No. 3,625,481, is cognizant of attempts to simplify the assembling of pilot valves; however, while such prior art attempts have reduced labor costs and simplified assembly, there remains room for improvement particularly with respect to the requirement of precision valve stem machining and valve stem manipulation during assembly. Pilot valve assemblies have in the past utilized retaining rings to limit axial movement of a washer or backup plate, as exemplified by U.S. Pat. No. 2,902,249; however, such valve assemblies have the disadvantages of requiring additional machining of the valve stem to receive the retaining ring while the retaining ring is used primarily as a spacer and is mounted on the valve stem prior to insertion of the head of the valve stem in a molded valve face such that costs and assembly time are not reduced.

SUMMARY OF THE INVENTION

The present invention is generally characterized in a valve assembly including a valve stem having a tapered end and a circumferential groove longitudinally spaced from the tapered end, a retainer having a body with a cavity therein receiving the tapered end of the valve stem, a flange extending from the body and an internal shoulder formed at an end of the body in the cavity, a backup plate surrounding the body of the retainer and having a flange extending therefrom and a wall with an aperture therein aligned with the cavity and extending over the internal shoulder to define a recess surrounding the valve stem and aligned with the circumferential groove in the valve stem, a resilient valve face disposed between the flanges of the retainer and the backup plate, and a split retaining ring received in the circumferential groove in the valve stem and extending into the recess to be captured between the retainer and the backup plate, the retaining ring having an initial shape to be captured between the retainer and the backup plate and being expandable to ride over the surface of the valve stem between the tapered end and the circumferential groove whereby the valve assembly can be assembled by inserting the tapered end of the valve stem through the aperture in the backup plate and the retaining ring into the cavity in the body of the retainer such that the retaining ring expands to ride over the surface of the valve stem and contracts into the circumferential groove.

Accordingly, it is a primary object of the present invention to construct a valve assembly that can be easily and inexpensively produced and assembled to overcome the above-mentioned disadvantages of the prior art.

Another object of the present invention is to capture a split retaining ring between a backup plate and a retainer to contract around a valve stem inserted in the retainer.

The present invention has a further object in that a valve stem is provided with a circumferential groove having a "V" configuration in cross section with sloping sides to permit a retaining ring seated in the groove to expand and move out of the groove to diassemble a valve assembly if sufficient force is applied in a direction to remove the valve stem from the valve assembly.

An additional object of the present invention is to reduce the number of steps required to assemble a pilot valve assembly without increasing the cost of components.

Some of the advantages of the present invention over the prior art are that costs are reduced, no drilling of components is required and, of utmost importance, the assembly steps are in-line and subject to automation thereby increasing production rate by at least a factor of two.

Other objects and advantages of the present invention will become apparent from the following description of the preferred embodiment taken in conjunction with the accompanying drawings.

DESCRIPTION OF THE PREFERRED EMBODIMENT

Figure 1:
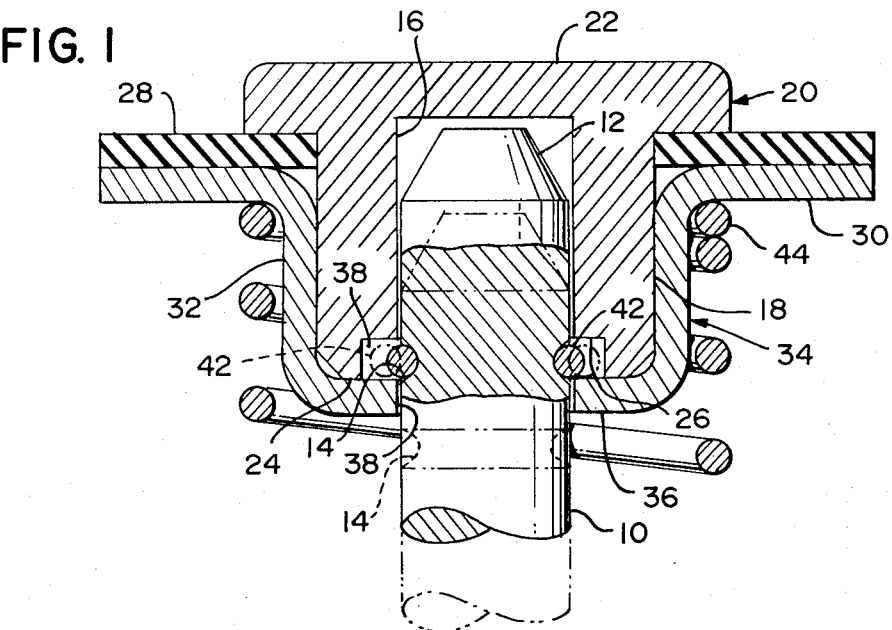
FIG. 1 is a broken axial sectional view of a valve assembly according to the present invention.
Figure 2:
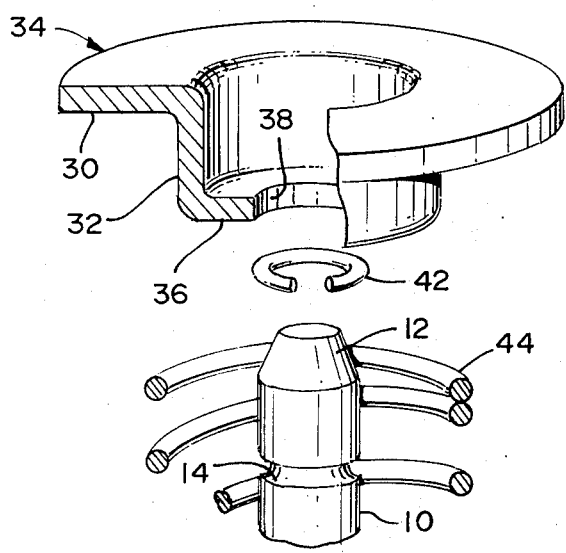
FIG. 2 is an exploded view of the valve assembly of FIG. 1.

A pilot valve assembly according to the present invention is illustrated in FIGS. 1 and 2 and includes a cylindrical, metal valve stem 10 having a tapered end 12 with a frustoconical configuration and an annular, circumferential groove 14 therearound longitudinally spaced from tapered end 12, the groove 14 having a rounded "V" configuration in cross section with sloping sides. The tapered end 12 of the valve stem 10 is received in a cylindrical, axial cavity 16 in a cylindrical body 18 of a metal retainer 20 having a circular flange 22 extending transversely extending transversely from the axis of the body 18. The body 18 terminates at an end 24 having an annular internal shoulder 26 formed therein adjacent cavity 16.

An annular resilient valve face 28 is sandwiched between the flange 22 of retainer 20 and an annular flange 30 extending transversely from the axis of a cylindrical cup-shaped portion 32 of a metal valve backup plate 34, the cup-shaped portion 32 having a bottom wall 36 with an aperture 38 therein aligned with cavity 16. The bottom wall 36 extends over internal shoulder 26 to define an annular recess 40 for receiving and capturing a split retaining ring 42 between the retainer 20 and the backup plate 34. A coiled bias spring 44 is disposed around valve stem 10 and is mounted in compression such that one end seats on the flange 30 of backup plate 34.

Figure 3:
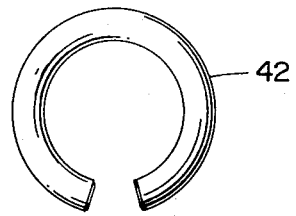
FIG. 3 is a plan view of the split retaining ring of the valve assembly of FIG. 1.

The split retaining ring 42 has a circular configuration in cross section; and, as shown in FIG. 3, retaining ring 42 preferably has a "C" configuration and an initial shape to be captured between retainer 20 and backup plate 34 in recess 40. That is, the outer diameter of the retaining ring 42 in the initial shape is greater than the diameters of cavity 16 and aperture 38 while the inner diameter of the retaining ring in the initial shape is greater than the diameter of the end 12 of the valve stem 10. The split retaining ring 42 is preferably made of metal and is expandable, due to the split therein, to ride over the surface of the valve stem 10 from the tapered end 12 to the groove 14 where the retaining ring contracts to lock the valve assembly together. The split retaining ring 42 can have any suitable configuration in cross section, the circular cross section being preferred in order to facilitate assembly and diassembly of the valve assembly.

In order to assemble the valve assembly, the split retaining ring 42 is positioned on the internal shoulder 26 of the retainer 20 and then the valve face 28 and the backup plate 34 are press fit over the body 18 of the retainer, the cup-shaped portion 32 surroudning the body 18 with the bottom wall 36 extending over the internal shoulder to capture the retaining ring 42 in the annular recess 40 between the retainer 20 and the backup plate 34. The tapered end 12 of the valve stem 10 is now inserted through the aperture 38 in the backup plate 34 and through the retaining ring 42 to be received in the cavity 16. As the valve stem is inserted, the split retaining ring 42 expands and rides up the tapered end 12, as shown in phantom in FIG. 1, and along the surface of valve stem 10 to the groove 14, the recess 40 having a size to accommodate the retaining ring therein in its expanded state. When the valve stem 10 is fully inserted, the retaining ring 42 contracts into the groove 14 locking the valve assembly together.

If it is desired to service or rework the valve assembly, the valve stem 10 can be removed by applying a force thereto sufficient to expand the retaining ring 42 and permit it to ride up the sloping sides of the groove 14 to disassemble the valve assembly. The slope of the sides of the groove 14 is such that the retaining ring 42 will not ride out of the groove unless considerable force is applied to the valve stem thereby preventing accidental or inadvertent disassembly.

Inasmuch as the present invention is subject to many variations, modifications and changes in detail, it is intended that all matter contained in the foregoing description or shown on the accompanying drawings shall be interpreted as illustrative and not in a limiting sense.

What is claimed is:
1. A valve assembly comprising
   a valve stem having a tapered end and a circumferential groove longitudinally spaced from said tapered end;
   retainer means having a body with a cavity therein receiving said tapered end of said valve stem, flange means extending from said body, and an internal shoulder formed at an end of said body in said cavity;
   a backup plate surrounding said body of said retainer means and having flange means extending therefrom and a wall having an aperture therein aligned with said cavity in said body of said retainer means, said wall extending over said internal shoulder to define a recess surrounding said valve stem and aligned with said circumferential groove in said valve stem;
   a resilient valve face disposed between said flange means of said retainer means and said flange means of said backup plate; and
   a split retaining ring received in said circumferential groove in said valve stem and extending into said recess to be captured between said retainer means and said backup plate, said retaining ring having an initial shape to be captured between said retainer means and said backup plate and being expandable to ride over the surface of said valve stem between said tapered end and said circumferential groove whereby said valve assembly can be assembled by inserting said tapered end of said valve stem through said aperture in said backup plate and said retaining ring into said cavity in said body of said retainer means such that said retainer ring expands to ride over the surface of said valve stem and contracts into said circumferential groove.

2. A valve assembly as recited in claim 1 wherein said circumferential groove in said valve stem has a rounded "V" configuration in cross section with sloping sides to permit said retaining ring to expand and move out of said circumferential groove if sufficient force is applied in a direction to remove said valve stem from said valve assembly.

3. A valve assembly as recited in claim 1 wherein said valve stem is cylindrical, said body of said retainer means is cylindrical with said cavity and said internal shoulder, axially formed therein, and said backup plate has a cylindrical cup-shaped portion coaxially surrounding said body with said aperture formed in a bottom wall thereof.

4. A valve assembly as recited in claim 3 wherein said flange means of said retainer means is an annular flange extending transversely from the axis of said body and said flange means of said backup plate is an annular flange extending transversely from the axis of said cup-shaped portion.

5. A valve assembly as recited in claim 4 wherein said circumferential groove in said valve stem has a rounded "V" configuration in cross section with sloping sides to permit said retaining ring to expand move out of said circumferential groove if sufficient force is applied in a direction to remove said valve stem from said valve assembly.

6. A valve assembly as recited in claim 5 wherein said retaining ring has a "C" configuration.

7. A valve assembly as recited in claim 6 wherein said retaining ring is circular in cross section.

8. A valve assembly as recited in claim 6 wherein said recess is annular and is of a size to accommodate said retaining ring when said retaining ring is expanded to ride over the surface of said valve stem.

9. A valve assembly as recited in claim 8 wherein said retainer means is a single member formed of metal, and said backup plate and said retaining ring are formed of metal.

10. A valve assembly as recited in claim 1 wherein said recess is annular and is of a size to accommodate said retaining ring when said retaining ring is expanded to ride over the surface of said valve stem.

* * * * *